US008355020B1

(12) United States Patent
Hanau et al.

(10) Patent No.: US 8,355,020 B1
(45) Date of Patent: Jan. 15, 2013

(54) REFINING QUILTS OF PATCHES REPRESENTING THREE DIMENSIONAL STRUCTURES

(75) Inventors: Paul Hanau, Portland, OR (US); Bennett Battaile, Portland, OR (US)

(73) Assignee: Autodesk, Inc., San Rafael, CA (US)

( * ) Notice: Subject to any disclaimer, the term of this patent is extended or adjusted under 35 U.S.C. 154(b) by 964 days.

(21) Appl. No.: 12/381,625

(22) Filed: Mar. 13, 2009

Related U.S. Application Data

(60) Provisional application No. 61/205,775, filed on Jan. 23, 2009.

(51) Int. Cl.
G06T 15/00 (2011.01)
G06T 17/00 (2006.01)
G09G 5/00 (2006.01)

(52) U.S. Cl. .......................... 345/419; 345/428; 345/581

(58) Field of Classification Search ........................ None
See application file for complete search history.

(56) References Cited

U.S. PATENT DOCUMENTS 5,636,338 A * 6/1997 Moreton ........................ 345/442
6,718,291 B1 * 4/2004 Shapiro et al. ..................... 703/2
7,142,206 B1 11/2006 Moreton
7,250,946 B1 7/2007 Moreton

OTHER PUBLICATIONS

ATI Truform Technology, "ATI Truform Technology: curve as the most beautiful distance between two points" [online], (retrieved on Jan. 6, 2009). Retrieved from the Internet: <URL: http://www.eng.uci.edu/comp.arch/papers-wallace/hpca3-block.ps>, 12 pages.
ATI, "Curved PN Triangles," [online], (retrieved on Jan. 6, 2009). Retrieved from the Internet: <URL: http://ati.amd.com/developer/curvedpntriangles.pdf> , 8 pages.
Boubekeur, Tamy "Scalar Tagged PN Triangles," Eurographics 2005, Short Presentations, 4 pages.
Eric Haines: Real-Time Rendering, Publisher: A K Peters, Ltd., Aug. 2002, Chapter 13, pp. 184-185.
Eric Haines: Real-Time Rendering, Publisher: A K Peters, Ltd., Aug. 2002, Chapter 13, pp. 598-599.
Eric Haines: Real-Time Rendering, Publisher: A K Peters, Ltd., Aug. 2002, Chapter 13, pp. 600-601.
Eric Haines: Real-Time Rendering, Publisher: A K Peters, Ltd., Aug. 2002, Chapter 13, pp. 602-603.
Eric Haines: Real-Time Rendering, Publisher: A K Peters, Ltd., Aug. 2002, Bibliography, pp. 928.

* cited by examiner

*Primary Examiner* — Joni Richer
*Assistant Examiner* — Michelle Chin
(74) *Attorney, Agent, or Firm* — Fish & Richardson P.C.

(57) ABSTRACT

Methods, systems, and apparatus, including computer program products, are provided for refining quilts of patches representing three dimensional structures. A method is provided that includes generating a first quilt representation of a three-dimensional structure, adding information to the first quilt representation, and generating a second quilt representation based on the first quilt representation. The first quilt representation is based on a model and associated with a first display level of detail. The second quilt representation is associated with a second display level of detail higher than the first display level of detail.

51 Claims, 14 Drawing Sheets
(7 of 14 Drawing Sheet(s) Filed in Color)

REFINING QUILTS OF PATCHES REPRESENTING THREE DIMENSIONAL STRUCTURES

CROSS-REFERENCE TO RELATED APPLICATIONS

This application claims priority to U.S. Provisional Application Ser. No. 61/205,775, filed Jan. 23, 2009, the entire contents of which are hereby incorporated by reference.

BACKGROUND

Various three-dimensional (3D) modeling systems use geometric models of structures with varying degrees of precision. Some systems use both a precise model (for instance, a Boundary Representation model) and an approximate mesh representation (for instance, a mesh of triangles) that is based on the precise model. The system generates the mesh representation by faceting (in other words, tessellating) the precise model. The system uses the mesh representation, rather than the precise model, for display in some situations to save memory or processing time or both. In some 3D modeling systems, display hardware is optimized to display mesh representations.

When a 3D modeling system displays a structure using a mesh representation, the display of the structure can be good in certain views and bad in other views. For example, the system can load a mesh representation of a structure with sufficient detail (that is, a sufficient display level of detail) so that it accurately represents a precise model of the structure when the user is viewing it at a 50% zoom level. But when the user zooms in to a 100% zoom level, the mesh representation can appear to be different from the precise model. A 3D modeling system may not generate a new mesh representation when the user zooms in to save memory or processing time or for other reasons.

FIG. 1A shows a mesh representation 100 of a model of a structure displayed at a first zoom level. The mesh representation 100 is associated with a display level of detail appropriate for the first zoom level. At this first zoom level, the circular holes 102 appear to be perfect circles. FIG. 1B shows the same mesh representation 100 displayed at a second zoom level. At this second zoom level, the circular holes 102 appear to have jagged edges.

A mesh representation that appears differently than expected can be alarming to a user. In particular, a user of Computer Aided Design (CAD) software may be designing precise mechanical structures that need to fit other structures or have certain structural properties. If a structure does not appear as specified in a precise model, the user can become distrustful of the entire system.

One technique for improving the appearance of meshes of triangles involves replacing flat triangles with cubic Bezier patches, a curved shape that can be divided (by faceting) into a number of smaller flat subtriangles. Each original triangle includes, for each of its vertices, a surface normal vector. The surface normal vectors are typically included with a mesh of triangles to permit advanced shading or for other purposes. However, the surface normals can be used to determine Bezier control points associated with the triangles. The triangles, including their surface normal vectors and Bezier control points, are known as "curved point-normal triangles," "PN triangles," or "N-patches" (hereafter "N-patches"). TRUFORM technology by ATI Technologies, currently owned by Advanced Micro Devices (AMD) of Sunnyvale, Calif., uses N-patch techniques.

SUMMARY

In general, one or more aspects of the subject matter described in this specification can be embodied in one or more methods that include generating a first quilt representation of a three-dimensional structure, including: identifying a model of the three-dimensional structure; and faceting the model and generating the first quilt representation, the first quilt representation including a plurality of patches, the first quilt representation being associated with a first display level of detail, where the faceting is performed by one or more first processors. Information is added to the first quilt representation, including: identifying an external edge of the three-dimensional structure based on the model, identifying a first patch in the plurality of patches, the first patch including a first plurality of vertices, and a first vertex of the first plurality of vertices being on the identified external edge, and determining an edge direction vector for the identified external edge at the first vertex based on the model. A second quilt representation is generated based on the first quilt representation, including: determining one or more first control points for the first patch based on the first vertex and the associated edge direction vector, and associating the one or more first control points with the first quilt representation to generate the second quilt representation, the second quilt representation being associated with a second display level of detail, the second display level of detail being higher than the first display level of detail. Other embodiments of this aspect include corresponding systems, apparatus, and computer program products.

These and other embodiments can optionally include one or more of the following features. Adding information to the first quilt representation can further include: identifying a second patch in the plurality of patches, the second patch including a second plurality of vertices, a second vertex being in the second plurality of vertices, determining a normal vector for the second patch using the model, the normal vector being normal to the surface of the three-dimensional structure at the second vertex, and associating the normal vector with the second vertex. Generating a second quilt representation based on the first quilt representation can further include: determining one or more second control points for the second patch based on the second vertex and the associated normal vector, and faceting the first quilt representation using the one or more second control points.

Generating the second quilt representation can be performed in response to a request for the second display level of detail. The edge direction vector can be normal or tangent to the direction of curvature of the identified external edge at the first vertex. The model of the three-dimensional structure can be one of: a boundary representation (B rep) model, a function representation (F-rep) model, or a constructive solid geometry model (CSG). The method can further include generating a mesh representation of the 3-D dimensional structure, including faceting the second quilt representation using the one or more control points, the mesh representation including a plurality of triangles. The one or more first processors can comprise a central processing unit (CPU), and generating the mesh representation can be performed by one or more second processors, where the one or more second processors comprise a graphics processing unit (GPU).

Determining the one or more first control points can be performed by the CPU. Determining the one or more first control points can be performed by the GPU.

In general, one or more aspects of the subject matter described in this specification can be embodied in one or more methods that include generating a first quilt representation of a three-dimensional structure, including: identifying a model of the three-dimensional structure, and faceting the model and generating the first quilt representation, the first quilt representation including a plurality of patches, the quilt representation being associated with a first display level of detail, where the faceting is performed by one or more first processors. Information is added to the first quilt representation, including: identifying a surface on the three-dimensional structure in the model, the surface including cross-curvature components, identifying a first patch in the plurality of patches, the first patch including a first plurality of vertices, and a first vertex of the first plurality of vertices being on the identified surface, using the model, determining texture coordinate data for the first vertex and associating the texture coordinate data with the first vertex, and using the model, determining cross-curvature direction data for the first vertex and associating the cross-curvature direction data with the first vertex. A second quilt representation is generated based on the first quilt representation, including: determining a tangent vector for the first vertex based on the associated texture coordinate data and the associated cross-curvature direction data, determining one or more first control points for the first patch based on the first vertex and the tangent vector; and associating the one or more first control points with the first quilt representation to generate the second quilt representation, the second quilt representation being associated with a second display level of detail. Other embodiments of this aspect include corresponding systems, apparatus, and computer program products.

These and other embodiments can optionally include one or more of the following features. Adding information to the first quilt representation can further include: identifying a second patch in the plurality of patches, the second patch including a second plurality of vertices, a second vertex being in the second plurality of vertices, determining a normal vector for the second patch using the model, the normal vector being normal to the surface of the three-dimensional structure at the second vertex, and associating the normal vector with the second vertex. Generating a second quilt representation based on the first quilt representation can further include: determining one or more second control points for the second patch based on the second vertex and the associated normal vector, and faceting the first quilt representation using the one or more second control points.

Generating the second quilt representation can be performed in response to a request for the second display level of detail. The structure can be one of: a torus, a toroid, a toroidal fillet, a helical structure, a helical coil, or another structure including a surface with curvature in directions tangent to the surface. The model of the three-dimensional structure can be one of: a boundary representation (B rep) model, a function representation (F-rep) model, or a constructive solid geometry model (CSG). The method can further include generating a mesh representation of the 3-D dimensional structure, including faceting the second quilt representation using the one or more control points, the mesh representation including a plurality of triangles. The one or more first processors can comprise a central processing unit (CPU), and generating the mesh representation can be performed by one or more second processors, where the one or more second processors comprise a graphics processing unit (GPU). Determining the one or more first control points can be performed by the CPU.

Determining the one or more first control points can be performed by the GPU.

Texture coordinate data can include UV parameter information comprising a U direction coordinate and a V direction coordinate. Texture coordinate data can be based on the parameter space of the model. Cross-curvature direction data can include a U direction tangent vector giving the direction tangent to the surface in the U direction and a V direction tangent vector giving the direction tangent to the surface in the V direction. Cross-curvature direction data can include scalar data giving the aspect ratio of parameter space in the U and V directions. Determining a tangent vector based on the associated texture coordinate data and the associated cross-curvature direction data can include: determining a difference vector comprising the difference in UV parameter space between the texture coordinates at the first vertex and the texture coordinates at a second vertex at the other end of a patch edge associated with the first vertex; and determining the linear combination of a U direction tangent vector and a V direction tangent vector at the first vertex and weighting the determined linear combination using the difference vector; and determining the tangent vector based on the weighted linear combination.

Particular embodiments of the invention can be implemented to realize one or more of the following advantages. A quilt of patches can be generated from a model, for example, a precise geometric model. The quilt of patches can be refined while preserving the appearance of external edges in the quilt. The quilt of patches can be refined while preserving the appearance of surfaces with cross-curvature components in the quilt. The quilt of patches can be accurately refined without referring back to the original precise model, which can improve speed or memory or both. A graphics processing unit (GPU) can refine the quilt of patches because refining the quilt of patches is simpler than generating a quilt of patches from the model.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1A:
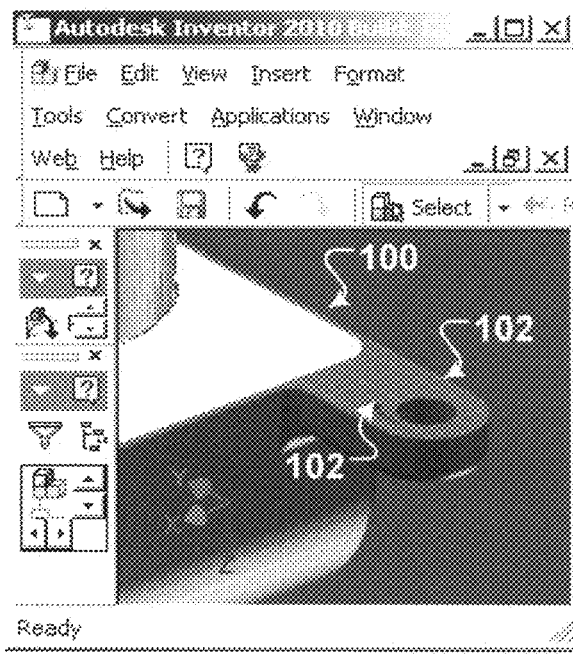
FIG. 1A shows a mesh representation of a model of a structure displayed at a first zoom level.
Figure 1B:
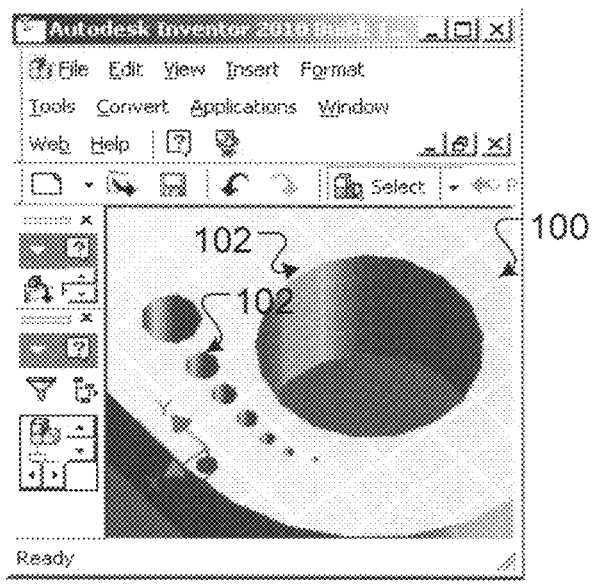
FIG. 1B shows the same mesh representation displayed at a second zoom level.
Figure 2:
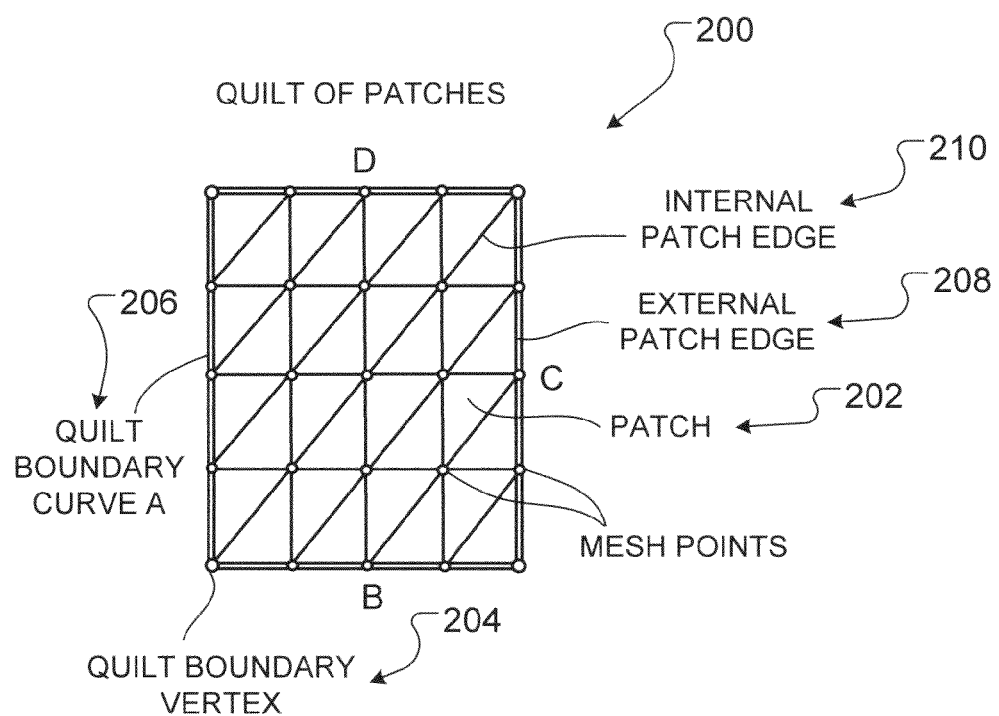
FIG. 2 shows an example quilt of patches.

FIG. 2 shows an example quilt 200 of patches. A patch (for example, patch 202) is a polygon having multiple vertices. A vertex (for example, quilt boundary vertex 204) is a corner point of a polygon. In some implementations, vertices are specified in Cartesian coordinates, where each vertex has an x coordinate, a y coordinate, and a z coordinate. In other implementations, vertices are specified using other coordinate systems, for example, spherical, cylindrical, and the like.

A quilt is a group of related patches. In a quilt, some or all of the patches can be connected. For example, a quilt of patches can represent a face of a 3D structure. Several quilts of patches representing faces can be connected to represent a 3D structure. In some implementations, several quilts of patches can be connected to form a quilt comprising one or more connected quilts. For purposes of illustration, the example quilt 200 is depicted in two dimensions; however, a quilt is typically three dimensional.

The example quilt 200 has external boundaries (for example quilt boundary curve A 206). Patch edges can be external edges (for example, external patch edge 208) and internal edges (for example, internal patch edge 210). An external edge is an edge on the external boundary. For example, where the quilt of patches represents a face of a 3D structure, the edges of the face are external edges. An internal edge is an edge on the inside of a quilt. For example, where the quilt of patches represents a face of a 3D structure, edges between patches internal to the face (that is, in the interior of the face) are internal edges.

Figures 3A, 3B:
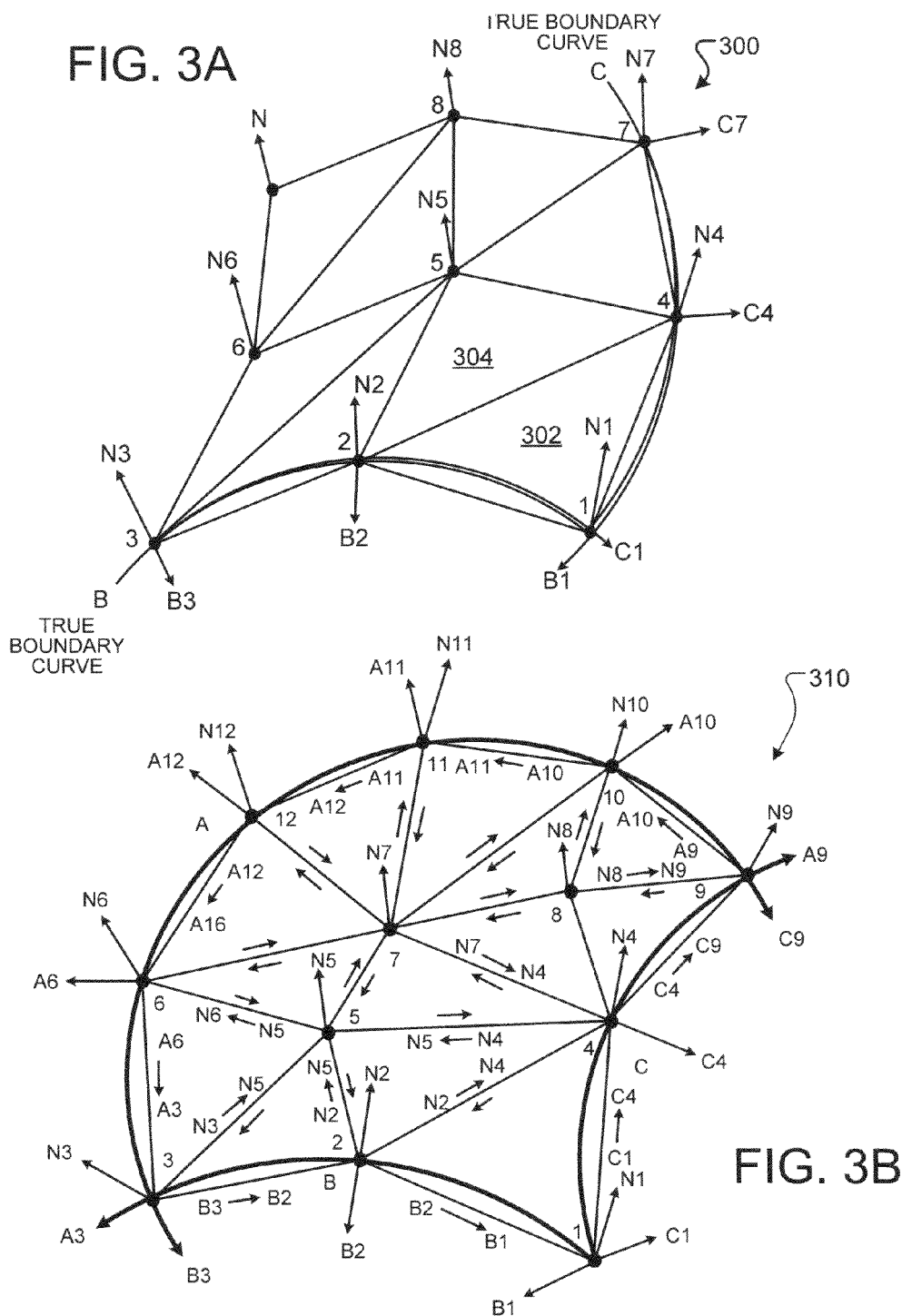
FIG. 3A shows an example quilt of patches and curved boundaries of a face that the quilt approximates.
FIG. 3B shows an example quilt with additional information regarding determining control points.

FIG. 3A shows an example quilt 300 of patches and curved boundaries of a face that the quilt 300 approximates. A patch (for example, patches 302 and 304) optionally has information associated with it or with its vertices. In some implementations, a patch has a surface normal vector associated with each of its vertices. A surface normal vector is a vector indicating a direction normal (that is, perpendicular, or orthogonal) to the surface (typically the face of the surface as given in a precise model) at that point. For example, a first example patch 302 formed by vertices 1, 2, and 4 has surface normal vector N1 associated with vertex 1, surface normal vector N2 associated with vertex 2, and surface normal vector N4 associated with vertex 4. In some implementations, vectors are specified in Cartesian coordinates using a tuple of scalar numbers. In other implementations, vectors are specified using other coordinates, for example, in reference to spherical or cylindrical unit vectors. In various implementations, a patch has associated vectors in addition to or instead of surface normal vectors.

In the example quilt 300, the edge of the first example patch 302 between vertices 1 and 2 is an external edge. That external edge is an approximation of the true boundary curve B (for example, an edge corresponding to a precise model edge). For example, boundary curve B can be specified by a precise model, and the example quilt 300 can be derived from the model (for instance, by faceting the model). The patch edge of the first example patch 302 between vertices 2 and 4 is an internal edge of the example quilt 300. The patch edge of a second example patch 304 between vertices 2 and 4 shares that edge and is thus also an internal edge of the example quilt 300.

In various implementations, a patch has associated vectors in addition to, or instead of, surface normal vectors. For example, edge direction vectors can be associated with patches and vertices of patches. An edge direction vector is a vector that provides information about an edge, typically about an edge curve. In some implementations, an edge direction vector points in a direction normal to the direction of curvature of an edge. For example, for a circular edge, the direction of edge direction vectors along the edge point radially outward in the plane of the circular edge (in other words, the edge direction vectors are orthogonal to the curve at each point along the edge). In other implementations, an edge direction vector is tangent to the true edge curve at a vertex on the boundary curve.

For another example, in FIG. 3A, vertex 1 of the first example patch 302 is associated with edge direction vectors B1 and C1. Edge direction vector B1 points in a direction normal to the curvature of edge B at vertex 1. Edge direction vector C1 points in a direction normal to the curvature of edge C at vertex 1. Similarly, vertex 2 of the first example patch 302 is associated with edge direction vector B2.

Surface normal vectors, edge direction vectors, and other information associated with patches and vertices can be used to determine control points (e.g., Bezier control points). The control points can be associated with vertices. For example, the control points can be associated with a vertex and a patch edge based on that vertex. Thus, control points can be determined for vertex 1 on the edge of the first example patch 302 between vertices 1 and 2. Similarly, control points can be determined for vertex 2 on the edge of the first example patch 302 between vertices 1 and 4. Additional control points can be determined along patch edges, using the associated vectors (for example, surface normal vectors or edge direction vectors) at the endpoints of each such edge of the patch. Thus, the patches and the control points can form curved Bezier patches.

Various techniques for determining control points using associated normal vectors are known to those of skill in the art. For example, N-patch technology uses surface normal vectors at each vertex in a mesh of triangles to generate control points for the triangles. Furthermore, patches can have control points corresponding to surfaces of varying orders. For example, third order surfaces (based on a cubic curve) are typically used, but second order surfaces (for example, based on a quadratic or parabolic curve) and higher order surfaces are possible.

FIG. 3B shows an example quilt 310 with additional information regarding determining control points. In FIG. 3B, patch edges are labeled to show one way to select associated vectors while determining control points.

At vertex 2, control points can be determined for four patch edges: the patch edge between vertex 2 and vertex 1, the patch edge between vertex 2 and 4, the patch edge between vertex 2 and vertex 5, and the patch edge between vertex 2 and vertex 3. In each case, the surface normal at vertex 2, N2, can be used to determine control points. Alternatively, in some cases, a better result can be reached by using the edge direction vector at vertex 2, B2.

At vertex 2, for the patch edge between vertex 2 and vertex 1, the label indicates that edge direction vector B2 can be used to determine control points. Using edge direction vector B2 results in control points that more accurately represent curve B because the patch edge between vertex 2 and vertex 1 is an external edge. Similarly, edge direction vector B2 can be used to determine control points for the patch edge between vertex 2 and vertex 3.

At vertex 2, for the patch edge between vertex 2 and vertex 4, the label indicates that surface normal vector N2 can be used to determine control points. Using surface normal vector N2 provides accurate control points because the patch edge between vertex 2 and vertex 4 is an internal edge. Similarly, surface normal vector N2 can be used to determine control points for the patch edge between vertex 2 and vertex 5.

At vertex 1, for the patch edge between vertex 1 and vertex 4, the label indicates that edge direction vector C1 can be used to determine control points. At vertex 1, for the patch edge between vertex 1 and vertex 2, the label indicates that edge direction vector B1 can be used to determine control points.

Although the patches depicted in FIG. 2, FIG. 3A, and FIG. 3B are triangular, patches can have varying numbers of vertices. Triangles are conventionally used but other polygons are possible.

Figure 4A:
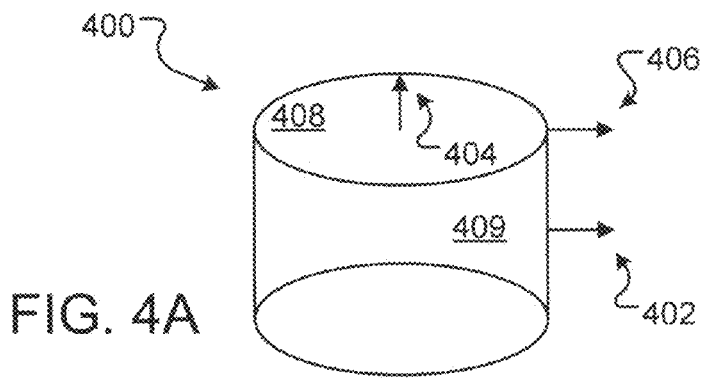
FIG. 4A shows a cylinder.

FIG. 4A shows a cylinder 400. Although not shown, the cylinder 400 can be represented by a quilt of patches. In some implementations, the faces of the cylinder 400 are represented by quilts of patches, and the whole cylinder is represented by a connected group of quilts. On the top face 408 of the cylinder 400, a surface normal vector 404 is perpendicular to the face 408 (that is, in the frame of reference of FIG. 4A, the surface normal vector 404 points directly "up" from the face 408.) Thus, for any vertices of a quilt of patches located on the top face 408 of the cylinder 400, an associated surface normal vector would have the same orientation relative to the face 408. On the side 409 of the cylinder 400, a surface normal vector 406 points out from the surface 409, and thus is orthogonal to the surface normal vector 404 on top 408 of the cylinder 400. Thus, for any vertices of a quilt of patches located on the side 409 of the cylinder 400, an associated surface normal vector would similarly point outward (that is, away from the side 409 of the cylinder). At the intersection of the side 409 of the cylinder and the top 408 of the cylinder, an edge direction vector 406 points outward from the surface of the side 409, and thus in the same direction as the surface normal vector 408 on the side 409 of the cylinder 400.

Figure 4B:
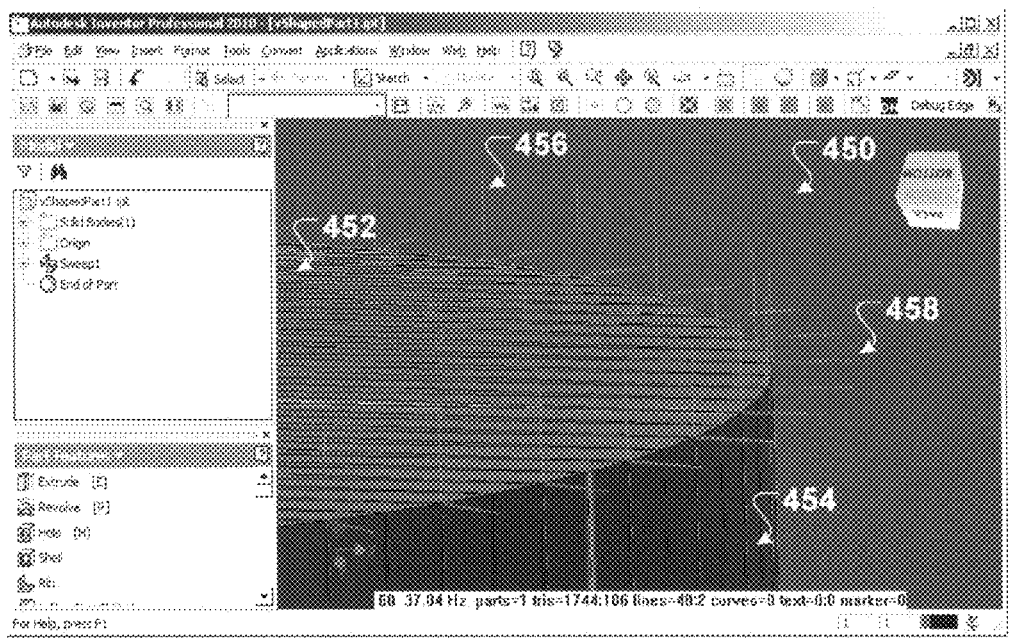
FIG. 4B shows a portion of a cylinder represented by a quilt of patches within an example graphical interface of a 3D modeling system.

FIG. 4B shows a portion 450 of a cylinder represented by a quilt of patches within an example graphical interface of a 3D modeling system. In some implementations, the quilt of patches includes two connected quilts of patches, including one quilt that represents the top 452 of the cylinder and one quilt that represents the side 454 of the cylinder. There is an external edge where the side 454 of the cylinder intersects the top 452. At each location where a patch on the side 454 of the cylinder meets a patch on the top 452 of the cylinder, the two patches have a vertex in the same location. However, each vertex has a different surface normal vector associated with it. Vertices that are part of patches on the top 452 of the cylinder have surface normal vectors that point "up" (shown in red, for example, surface normal vector 456) and vertices that are part of patches on the side 454 of the cylinder have surface normal vectors that point outward (shown in green and red, for example, surface normal vector 458). The vertices also have edge direction vectors (shown in green and red, for example, edge direction vector 458) associated with them. In this case, the edge direction vectors point in the same direction as the surface normal vectors for vertices associated with patches on the side 454 of the cylinder.

Figure 4C:
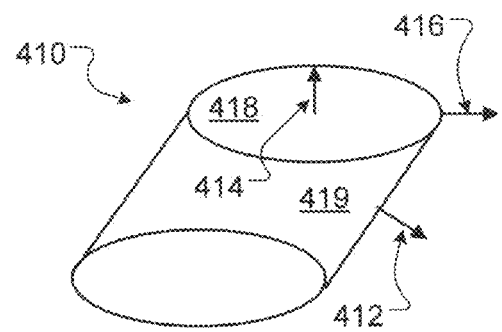
FIG. 4C shows a representation of an example slanted cylinder.

FIG. 4C shows a representation of an example slanted cylinder 410. A surface normal vector 414 on top 418 of the cylinder 410 points up, as it did for cylinder 400. Similarly, an edge direction vector 416 points outward. However, a surface normal vector 412 on the side 419 of the cylinder points away from the side 419, and is not the same as the edge direction vector 416.

Figure 4D:
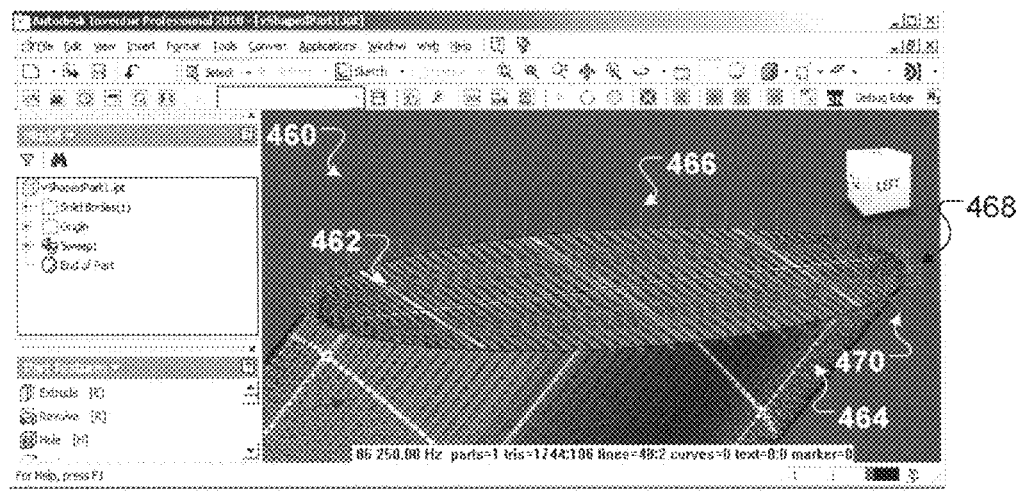
FIG. 4D shows a portion of a cylinder represented by a quilt of patches.

FIG. 4D shows a portion 460 of a cylinder represented by a quilt of patches. The portion 460 shows a similar slanted cylinder to the slanted cylinder 410 and is depicted as a set of faces where each face is represented by a quilt of patches. Surface normal vectors are shown in red (for example, surface normal vector 466) and edge direction vectors are shown in green (for example, edge direction vector 468).

When adding control points to the patches in a quilt of patches, surface normal vectors are typically used to determine the control points. However, when two patches share an external edge and thus have vertices at the same location, the surface normal vectors at that location can be different. For example, in FIG. 4D, surface normal vectors (for example, surface normal vector 466) on the top 462 of the cylinder are not pointing in the same direction as surface normal vectors (for example, surface normal vector 470) on the side 464 of the cylinder. If the control points are determined using the surface normal vectors, the control points along the external edge will be different and a gap will form along the edge between the two patches.

One solution to fill a gap is to create a fillet. A fillet is a quilt of patches used to fill a gap in a quilt of patches. In some implementations, a fillet is used to fill a gap between connected quilts of patches. For example, where a Boundary Representation (B-rep) model is faceted by generating a quilt of patches for each face in the model, a fillet can be used between connected quilts of patches where a gap appears between connected quilts.

Figure 4E:
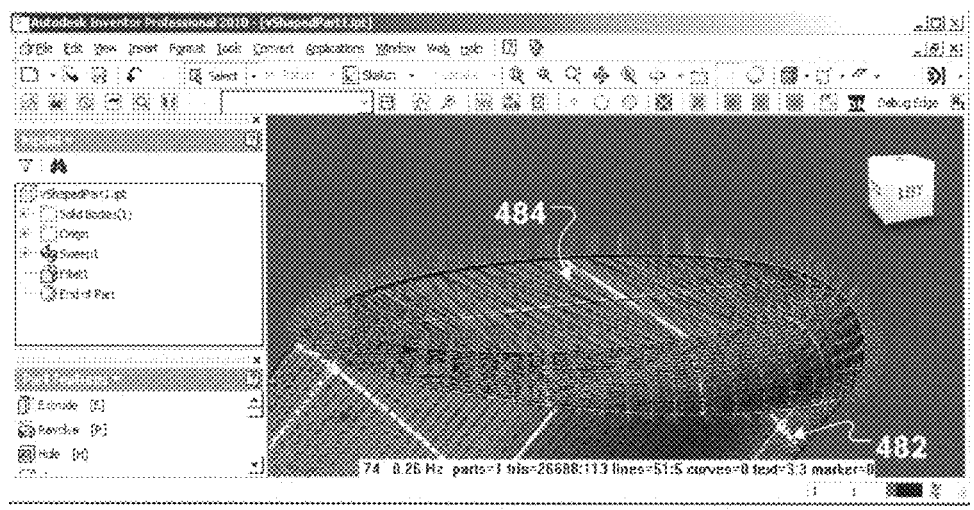
FIG. 4E shows an example fillet between the side of a slanted cylinder and the top of the cylinder.

FIG. 4E shows an example fillet between the side 482 of a slanted cylinder and the top 484 of the cylinder. The fillet causes the edge between the side 482 of the slanted cylinder and the top 484 to appear rounded. This rounded edge is undesirable, for example, in a CAD application where a structure should appear exactly as it was designed.

Figure 5A:
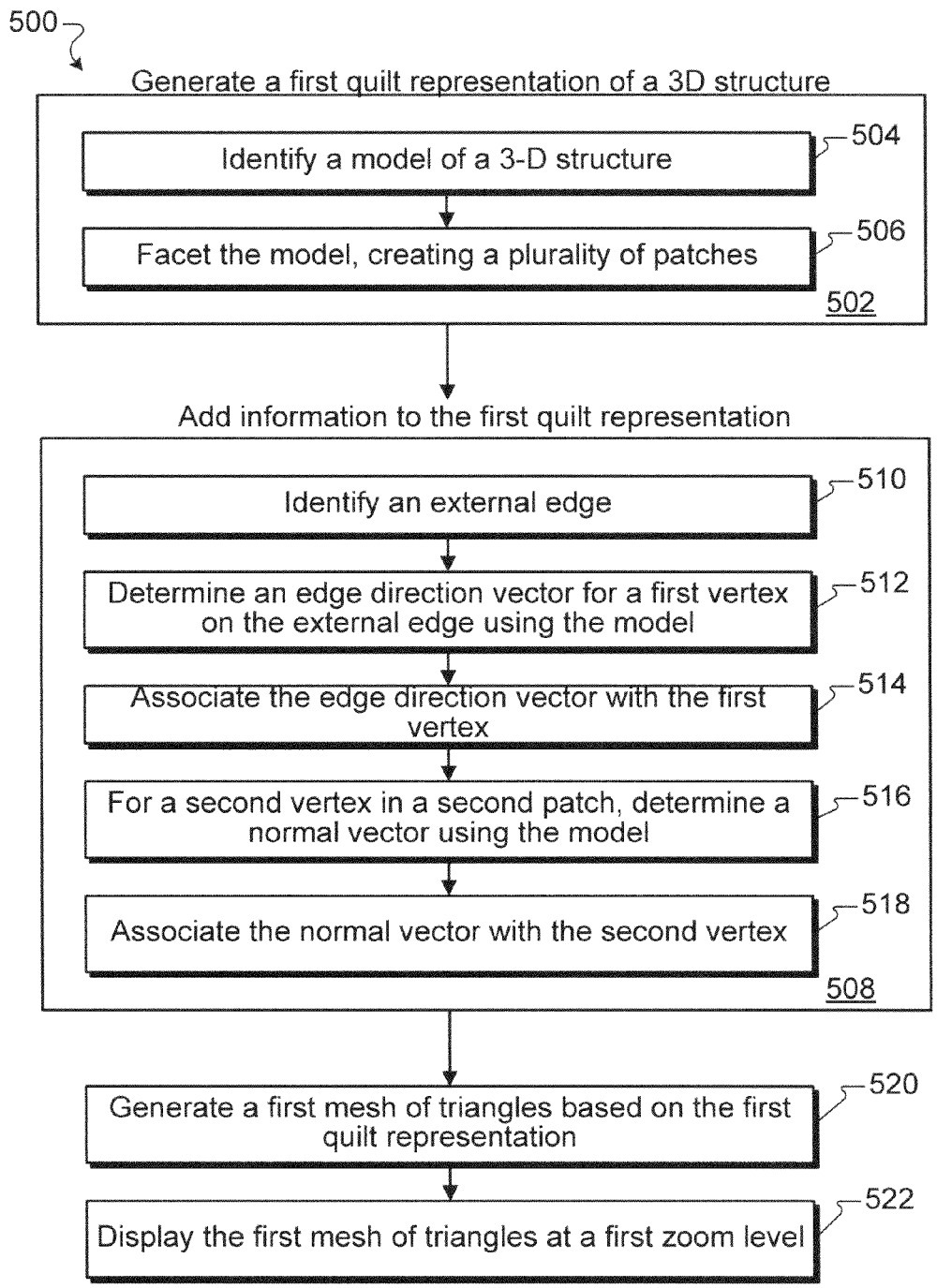
FIG. 5A is a flow diagram of an example technique 500 of generating a quilt representation of a structure.

FIG. 5A is a flow diagram of an example technique 500 of generating a quilt representation of a structure. Information is added to the quilt representation so that it can be refined while preserving the appearance of external edges in the structure. For purposes of illustration, the technique will be described in reference to a system (for example, a desktop graphics workstation with a central processing unit (CPU) and a graphics processing unit (GPU), or a web server communicating remotely with a mobile device, or the like) that performs the technique.

The system generates a first quilt representation of a 3D structure (step 502). To generate the first quilt representation, the system identifies a model of a 3D structure (step 504). The structure can be any object, for example, a box, a cylinder, a hammer, an engine, or the like. The model is typically a precise geometric model. In some implementations, the model is a Boundary Representation (B-rep) model. A B-rep typically includes faces described by higher-order surfaces (splines, cylinders, spheres, cones, etc.) bounded by curves (lines, circles, splines) that trim the surface to the desired shape. The faces adjoin each other along their bounding curves. Various types of B-rep models are possible, for example, winged edge B-rep models. In other implementations, the model is a Constructive Solid Geometry Model (CSG) model, a function representation (F-rep) model, a combination of models, or other type of model.

The system facets (or tessellates) the model, creating a plurality of patches (step 506). In some implementations, where the model is a B-rep model, the system creates a quilt (having multiple patches) for each face in the model. The faceting is performed by one or more first processors. In some implementations, the one or more first processors comprise a central processing unit (CPU).

The first quilt representation includes the plurality of patches. The number of patches depends on a display level of detail. A display level of detail specifies how detailed a quilt of patches needs to be (for example, how many patches are needed, or what precision numbers are needed) to appear appropriately at a certain zoom level. In some implementations, a display level of detail specifies how detailed a quilt of patches needs to be to appear appropriately at a certain zoom level after it is refined. In some implementations, a user specifies the desired display level of detail. In other implementations, the system uses a default display level of detail or determines the level of detail based on a user's view. The first quilt representation is associated with a first display level of detail.

The system adds information to the first quilt representation (step 508). The information includes, for example, surface normal vectors, edge direction vectors, and the like.

To add information, the system identifies an external edge (510). The system uses the model to identify the external edge. Various techniques for identifying external edges are possible. For example, the system can identify a first patch in the plurality of patches. The first patch includes a first plurality of vertices. A first vertex of the plurality of vertices is on the identified external edge.

The system determines an edge direction vector for the identified external edge at a first vertex using the model (step 512). In some implementations, the edge direction vector is normal to the direction of curvature of the identified external edge. In other implementations, an edge direction vector is tangent to the true edge curve at a vertex on the boundary curve. In general, the edge direction vector is not determined using any other quilt or quilts that might adjoin the first quilt. Therefore, the system can determine an edge direction vector even if the first quilt stands alone (for example, if the first quilt represents a surface that is not part of a solid). Furthermore, the system can determine an edge direction vector even if another quilt adjoining the first quilt is tangent to the first quilt along their common boundary; in that case, the surface normal vectors of the two quilts along the boundary are parallel, and thus do not give any information about the boundary direction. The system associates the edge direction vector with the first vertex (step 514).

Although the flow diagram illustrates determining an edge direction vector for only the first vertex, the system typically also performs the technique using most or all other vertices on the external edge. The system also optionally performs the technique using most or all other external edges in the model.

In some implementations, the system identifies vertices that are the endpoints of an external edge, and associates edge direction vectors with those vertices. In those implementations, the system optionally associates edge direction vectors with vertices between the endpoints on the external edge. Alternatively, the system determines approximations of the edge direction vectors at vertices between the endpoints by determining a linear combination of the adjacent patch edges. In some implementations, the system determines the linear combination by weighting shorter edges more heavily than longer edges because shorter edges more closely approximate the true direction of the edge in their vicinity. For example, the system can weight the linear combination based on the length of each edge.

In some implementations, the system adds surface normal information. The system identifies a second patch in the patches. The second patch includes second vertices. The second vertices include a second vertex. The system determines a surface normal vector for the second vertex using the model (step 516). The system associates the surface normal vector with the second vertex (step 518).

Although the flow diagram illustrates determining a surface normal vector for only the second vertex, the system typically also performs the technique using other vertices. For example, meshes of triangles used with N-patch technology include surface normal vectors at every point in the mesh. In some implementations, the system associates surface normal vectors with all vertices on internal edges. In other implementations, the system associates surface normal vectors with all vertices, whether they are on internal edges or external edges. In those implementations, vertices on external edges can have both surface normal vectors and edge direction vectors associated with them.

In some implementations, the system compresses information that it associates with the first quilt of patches. For example, the system can compress the surface normal vectors and the edge direction vectors. Various compression techniques are possible.

The system optionally displays the structure using the first quilt of patches. The system generates a first mesh of triangles based on the first quilt representation (step 520). In some situations, the first mesh of triangles is equivalent to the first quilt representation. In other situations, for example where the patches are higher order polygons or have associated control points, the system facets the quilt to generate the first mesh of triangles. In some implementations, generating the mesh representation is performed by one or more second processors. For example, the one or more second processors can comprise a graphics processing unit (GPU).

The system displays the first mesh of triangles at a first zoom level (step 522). For example, if the system includes or is attached to a monitor, the system displays the first mesh of triangles on the monitor. In another example, the system sends the first mesh of triangles to another system for display, or the system sends a two dimensional image of the first mesh of triangles for display.

Figure 5B:
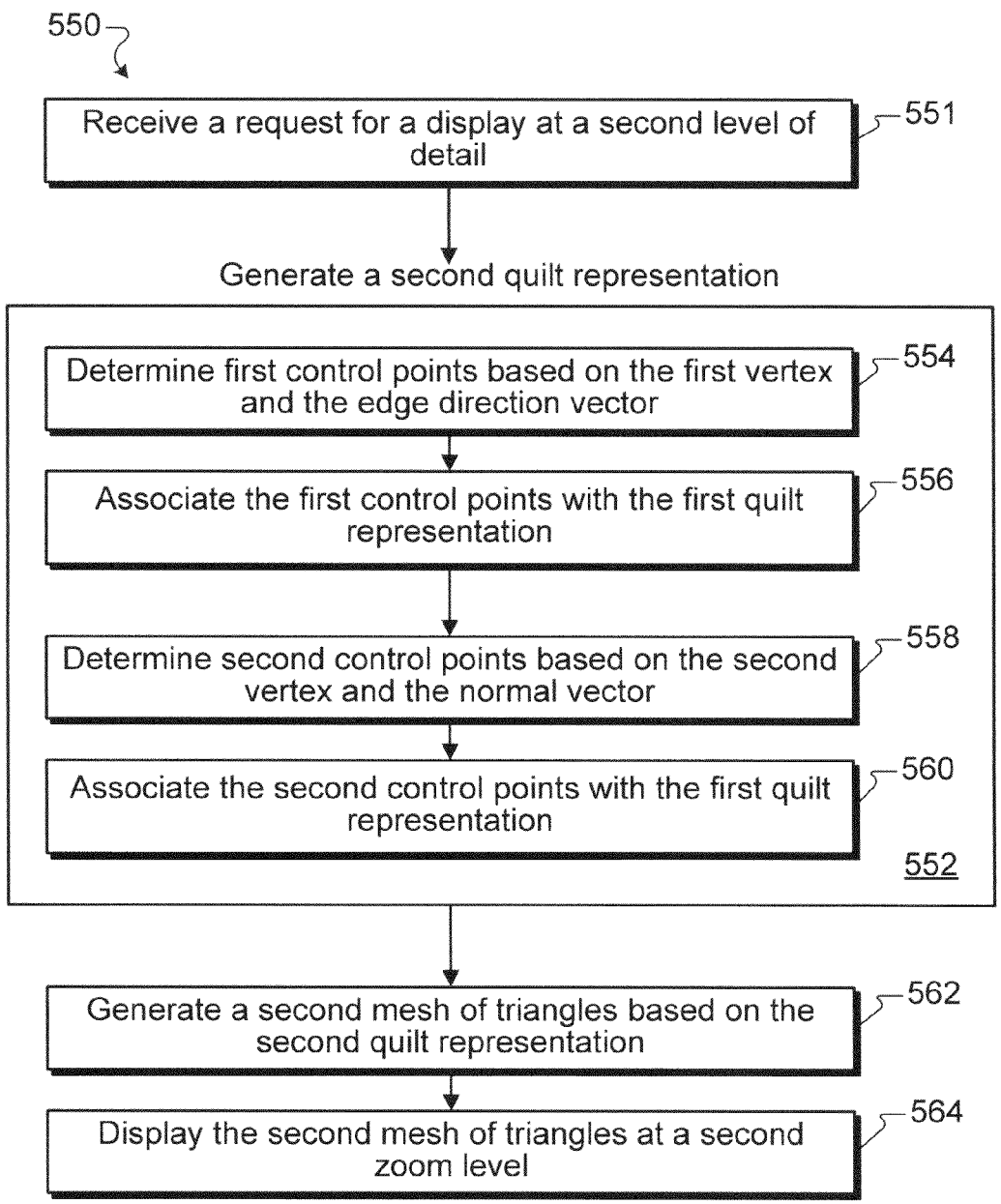
FIG. 5B is a flow diagram of an example technique 550 for refining a first quilt representation for a higher display level of detail while preserving the appearance of external edges in the structure.

FIG. 5B is a flow diagram of an example technique 550 for refining the first quilt representation (or any quilt representation generated by technique 500 or by other techniques) for a higher display level of detail while preserving the appearance of external edges in the structure. For purposes of illustration, the technique will be described in reference to a system (for example, a desktop graphics workstation with a central processing unit (CPU) and a graphics processing unit (GPU), or a web server communicating remotely with a mobile device, or the like) that performs the technique.

The system optionally receives a request for a display of the structure at a second level of detail (step 551). The second level of detail is higher than the first level of detail. In some implementations, the system receives a request from a user. For example, the user can zoom in on the structure. In other implementations, the system receives a request from another process, for example, a scripting engine or a request to render a view for printing or saving to an image file at higher precision than is used for display.

The system generates a second quilt representation (step 552). The second quilt representation is a refinement of the first quilt representation. In some scenarios, the second quilt representation does not show the entire structure. In those scenarios, the system optionally does not generate control points and patches for areas of the structure that do not need to be shown.

To generate the second quilt representation, the system determines one or more first control points for the first patch based on the first vertex and the associated edge direction vector (step 554). Various techniques for determining the one or more first control points are possible. In some implementations, where the edge direction vector is normal to the direction of curvature of the identified external edge at the first vertex, the techniques used to generate control points for N-patches can be used but with the edge direction vector substituted for the surface normal vector. Although the technique is illustrated as determining control points for only the first vertex, the system typically determines control points for other vertices.

The system associates the one or more first control points with the first quilt representation (step 556). In some implementations, the system keeps the first quilt representation and associates the one or more first control points with a copy. The system can generate other quilt representations from the first quilt representation when needed (for example, when a user zooms to a different display level of detail) and delete them when no longer needed.

In some implementations, where the system associated a surface normal vector with a second vertex, the system determines one or more second control points for the second patch based on the second vertex and the associated surface normal vector (step 558). The system associates the one or more second control points with the first quilt representation or a copy (step 560).

The system optionally displays the structure using the second quilt of patches. The system generates a second mesh of triangles based on the second quilt representation (step 562). Because the second quilt of patches has associated control points, the system facets the quilt to generate the second mesh of triangles.

In some implementations, generating the second mesh representation is performed by one or more second processors. For example, the one or more second processors can comprise a graphics processing unit (GPU). In various implementations, determining the one or more first control points is also performed by the one or more second processors.

The system displays the second mesh of triangles at a second zoom level (step 564).

Figure 6:
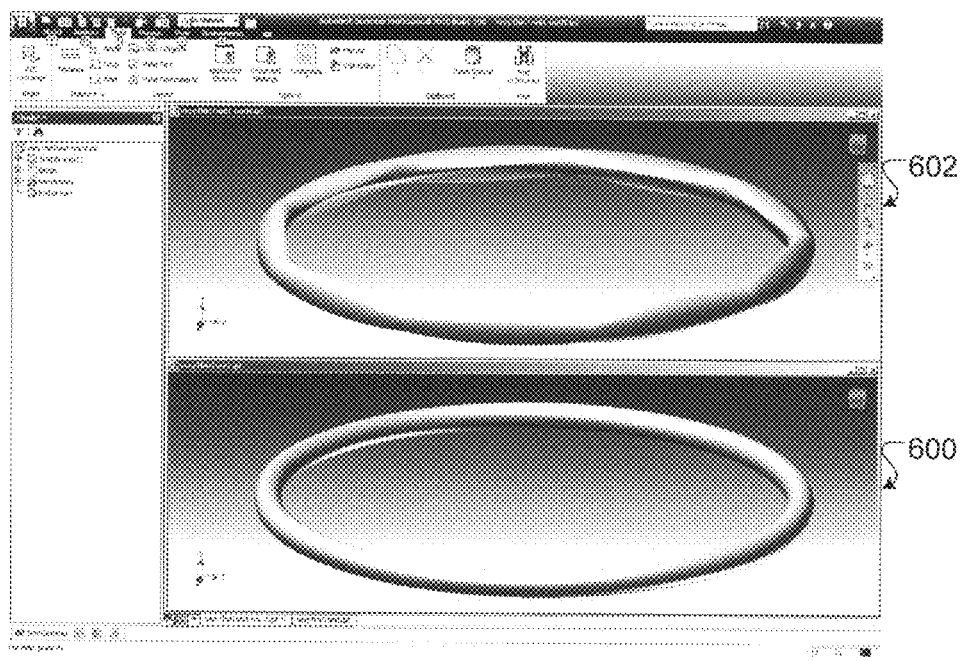
FIG. 6 shows a first torus and a second torus based on the first torus.

FIG. 6 shows a first torus 600 and a second torus 602 based on the first torus 600. The first torus 600 is smooth. The second torus 602 is generated using a quilt of patches based on a coarse sampling of the first torus 600 and shown at the same size as the first torus 600. The second torus 602 was created using N-patch techniques; that is, the patches in the second torus 602 are based on patches in the first torus 600 and associated normal vectors.

The second torus 602 correctly represents the first torus 600 along the equatorial regions of the torus 602 (that is, at the very outer edges). The surface normal vectors (not shown) along the equatorial regions all point radially outward, and therefore it is possible to determine the curvature of the surface based on the surface normal vectors.

The second torus 602 incorrectly represents the first torus 600 along the ridge regions (that is, at the top of the torus). The surface normal vectors along the ridge regions are all parallel to the axis of the torus (that is, they all point up) and thus parallel to each other. Therefore, the surface normal vectors do not indicate the curvature of the ridge regions. Consequently, refinement of a quilt of patches representing a torus using normal vectors results in inaccurate (relative to a precise model of the torus) refined patches.

Figure 7:
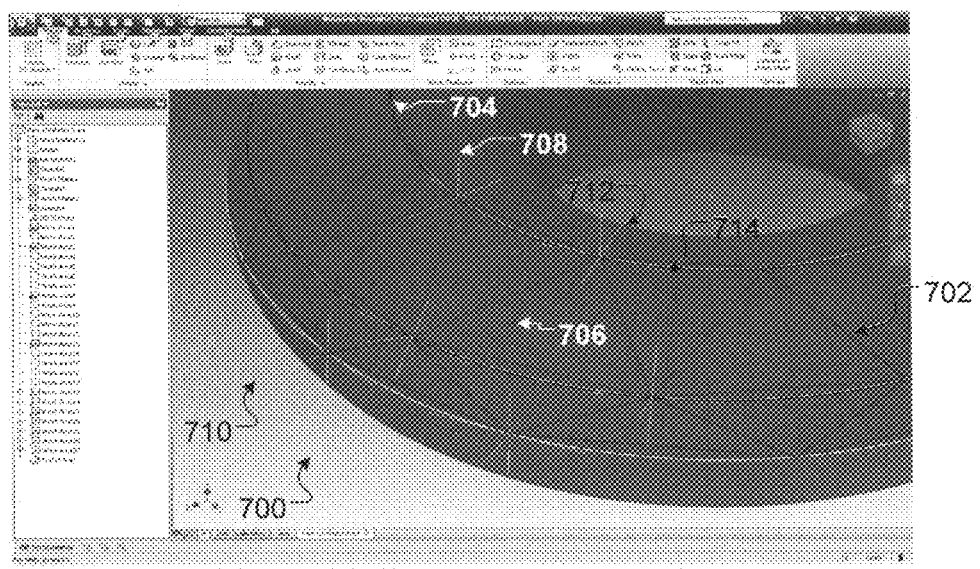
FIG. 7 shows a torus represented by a quilt of patches.

FIG. 7 shows a torus 700 represented by a quilt of patches. The dark blue lines (for example, 702) represent the edges of the patches that represent the torus. The black line 704 on top of the torus indicates the ridge region of the torus.

Vertices of patches are specified by their Cartesian coordinates. Additionally, some vertices are specified by their texture coordinates. Texture coordinates are commonly associated with vertices to support texture-image based coloration to the surface. Various techniques for determining texture coordinates are possible. For example, one method is to derive texture coordinates from the underlying parameter space of the precise model surface. The coordinates may be scaled to make texture space more isotropic (square), which makes textures look more natural. In general, the orientation and general layout of the UV coordinates is based directly on the surface parameter space, and not on an arbitrary scheme for generating texture coordinates.

In some implementations, texture coordinates include a U position coordinate in UV space and a V position coordinate in UV space. UV space identifies lines of latitude and longitude of the torus. The light grey lines (for example, 706) in FIG. 7 show a grid illustrating UV space. A U position coordinate and a V position coordinate can specify any point on the surface of the torus.

Some vertices are associated with cross-curvature direction data. Cross-curvature direction data is commonly associated with meshes of triangles to support bump-mapped textures. Cross-curvature direction data for a vertex in a patch indicates the directions of the UV parameter space at that vertex. For example, cross-curvature direction data can include a U direction vector indicating the U direction of the UV parameter space and a V direction vector indicating the V direction of the UV parameter space. In some implementations, cross-curvature direction data includes scalar data giving the relative scale or aspect ratio of parameter space in the U and V directions. In some implementations, cross-curvature data includes a U direction tangent vector giving the direction tangent to the surface in the U direction and a V direction tangent vector giving the direction tangent to the surface in the V direction. Various techniques for determining cross-curvature direction data are possible.

As shown in FIG. 7, surface normal vectors (for example, 708 and 710) are shown in yellow. Cross-curvature direction data, as U direction tangent vectors and V direction tangent vectors (for example, 712 and 714), are also shown in yellow.

Figure 8A:
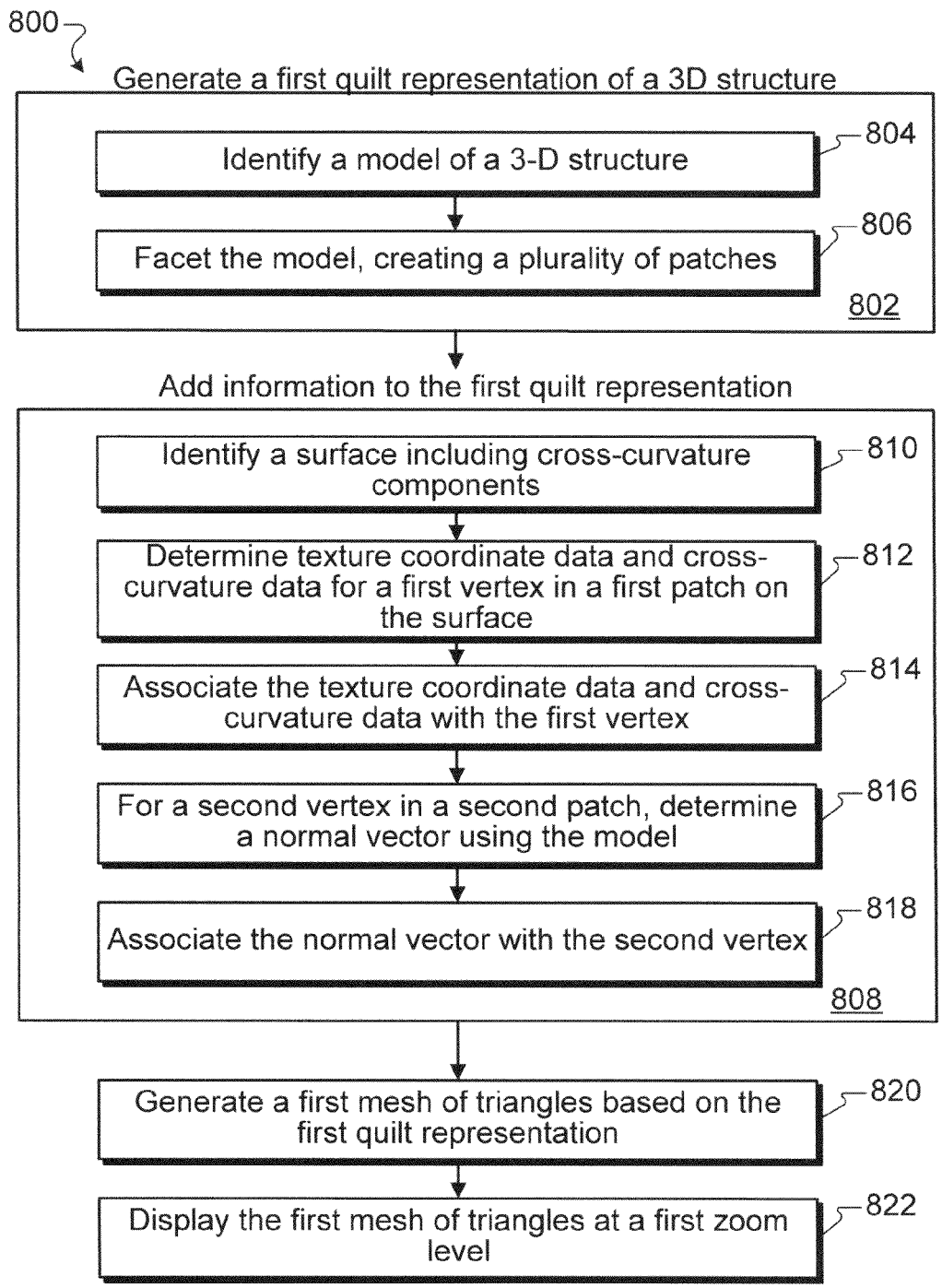
FIG. 8A is a flow diagram of an example technique 800 of generating a quilt representation of a structure.

FIG. 8A is a flow diagram of an example technique 800 of generating a quilt representation of a structure. Information is added to the quilt representation so that it can be refined while preserving the appearance of surfaces with cross-curvature components in the structure. For purposes of illustration, the technique will be described in reference to a system (for example, a desktop graphics workstation with a central processing unit (CPU) and a graphics processing unit (GPU), or a web server communicating remotely with a mobile device, or the like) that performs the technique.

The system generates a first quilt representation of a 3D structure (step 802). To generate the first quilt representation, the system identifies a model of a 3D structure (step 804). The structure can be any object, for example, a box, a cylinder, a hammer, an engine, or the like. The model is typically a precise geometric model. In some implementations, the model is a Boundary Representation (B-rep) model. A B-rep typically consists of faces described by higher-order surfaces (splines, cylinders, spheres, cones, etc.) bounded by curves (lines, circles, splines) that trim the surface to the desired shape. The faces adjoin each other along their bounding curves. Various types of B-rep models are possible, for example, winged edge B-rep models. In other implementations, the model is a Constructive Solid Geometry Model (CSG) model, a function representation (F-rep) model, a combination of models, or other type of model.

The system facets (or tessellates) the model, creating multiple patches (step 806). In some implementations, where the model is a B-rep model, the system creates a quilt (comprising a plurality of patches) for each face in the model. The faceting is performed by one or more first processors. In some implementations, the one or more first processors comprise a central processing unit (CPU).

The first quilt representation includes the patches. The number of patches depends on a desired display level of detail. In some implementations, a user specifies the desired display level of detail. In other implementations, the system uses a default display level of detail or determines the level of detail based on what a user is looking at. The first quilt representation is associated with a first display level of detail.

The system adds information to the first quilt representation (step 808). The information includes, for example, surface normal vectors, texture coordinate data, cross-curvature direction data, and the like.

To add information, the system identifies a surface on the structure including cross-curvature components (step 810). The system uses the model to identify the surface. Various techniques for identifying surfaces with cross-curvature components are possible. In general, a surface with cross-curvature components is a surface with curvature in a direction tangent to the surface. For example, the structure or the surface can be a torus, a toroid, a toroidal fillet, a helical structure, a helical coil, or the like. Additionally, a surface with cross-curvature components is one in which connected regions with the same surface normal do not lie along straight lines. For example, along the surface of a cone or cylinder, regions with the same surface normal direction lie along straight lines. In contrast, on a torus, regions of constant normal direction (along the "ridges") lie along circles.

The system identifies a first patch of the patches. The first patch includes first vertices. A first vertex of the vertices is on the identified surface.

The system determines texture coordinate data and cross-curvature data for the first vertex (step 812). In some implementations, the texture coordinate data includes UV parameter information comprising a U direction coordinate and a V direction coordinate.

In some implementations, the cross-curvature direction data includes a U direction tangent vector giving the direction tangent to the surface in the U direction and a V direction tangent vector giving the direction tangent to the surface in the V direction. In general, the U direction tangent vector and the V direction tangent vector are not both of unit length. Their relative lengths (in other words, the aspect ratio of UV space) typically vary across the surface. For example, as you go down into the "hole" of a torus, the length of a unit of latitude remains constant, but the length of a unit of longitude gets shorter, so the aspect ratio of a unit of UV space becomes more and more rectangular.

In some cases, where the system associates a surface normal vector with the first vertex and the U direction tangent vector is orthogonal to the V direction tangent vector, the system optionally only stores the U direction tangent vector (for instance, to save memory). In those cases, the system can determine the V direction tangent vector by determining the cross product of the surface normal vector with the U direction tangent vector. However, in such cases to the system can additionally determine the aspect ratio or relative lengths of the U direction tangent vector and the V direction tangent vector and associate that aspect ratio with first vertex. The U direction tangent vector and the V direction tangent vector are typically not of equal length and this ratio is needed to correctly construct the required tangent directions in Cartesian space.

Whether the U direction tangent vector is orthogonal to the V direction tangent vector depends on the surface. For example, on a typical torus the U direction tangent vector is orthogonal to the V direction tangent vector at all vertices, whereas on a coil, the U direction tangent vector is typically not orthogonal to the V direction tangent vector at many or any vertices. Thus, for vertices on the surface of a coil, the system typically associates both a U direction tangent vector and a V direction tangent vector with the vertices.

The system associates the texture coordinate data and the cross-curvature direction data with the first vertex (step 814).

Although the flow diagram illustrates determining texture coordinate data and cross-curvature direction data for only the first vertex, the system typically also performs the technique using most or all other vertices on the surface. The system also optionally performs the technique using other surfaces in the model.

In some implementations, the system adds surface normal information. The system identifies a second patch in the patches. The second patch includes second vertices. The second vertices include a second vertex. The system determines a surface normal vector for the second vertex using the model (step 816). The system associates the surface normal vector with the second vertex (step 818).

Although the flow diagram illustrates determining a surface normal vector for only the second vertex, the system typically also performs the technique using other vertices. For example, meshes of triangles used with N-patch technology include surface normal vectors at every point in the mesh. In some implementations, the system associates surface normal vectors with all vertices on internal edges. In other implementations, the system associates surface normal vectors with all vertices, whether they are on internal edges or external edges. In those implementations, vertices on external edges can have both surface normal vectors and edge direction vectors associated with them.

In some implementations, the system compresses information that it associates with the first quilt of patches. For example, the system can compress the surface normal vectors, the texture coordinate data, and the cross-curvature direction data. Various compression techniques are possible.

The system optionally displays the structure using the first quilt of patches. The system generates a first mesh of triangles based on the first quilt representation (step 820). In some situations, the first mesh of triangles is equivalent to the first quilt representation. In other situations, for example where the patches are higher order polygons or have associated control points, the system facets the quilt to generate the first mesh of triangles. In some implementations, generating the mesh representation is performed by one or more second processors. For example, the one or more second processors can comprise a graphics processing unit (GPU).

The system displays the first mesh of triangles at a first zoom level (step 822). For example, if the system includes, or is attached to, a monitor, the system displays the first mesh of triangles on the monitor. In another example, the system sends the first mesh of triangles to another system for display, or the system sends a two dimensional image of the first mesh of triangles for display.

Figure 8B:
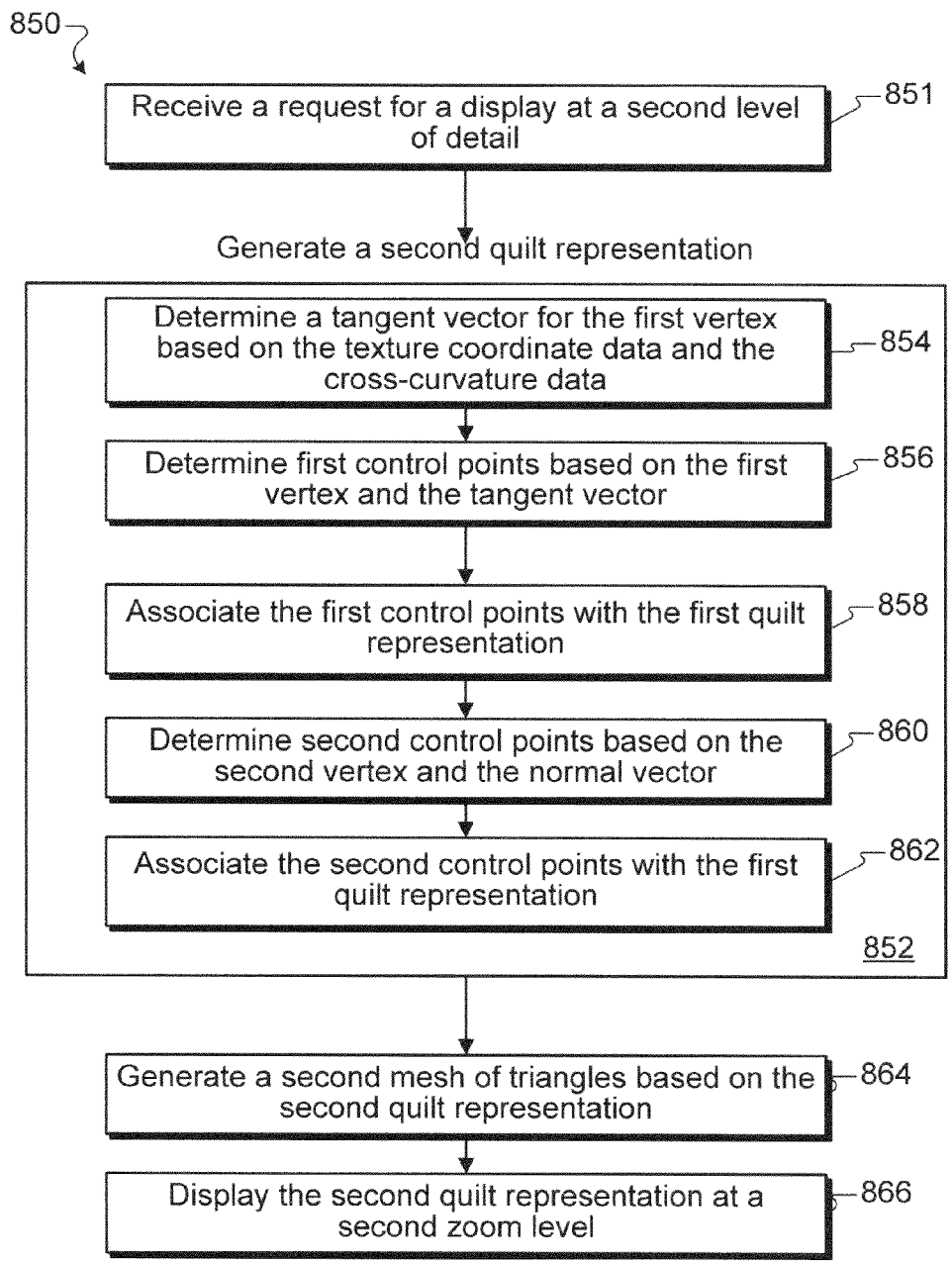
FIG. 8B is a flow diagram of an example technique 850 for refining the first quilt representation for a higher display level of detail while preserving the appearance of surfaces with cross-curvature components in the structure.

FIG. 8B is a flow diagram of an example technique 850 for refining the first quilt representation (or any quilt representation generated by technique 800 or by other techniques) for a higher display level of detail while preserving the appearance of surfaces with cross-curvature components in the structure. For purposes of illustration, the technique will be described in reference to a system (for example, a desktop graphics workstation with a central processing unit (CPU) and a graphics processing unit (GPU), or a web server communicating remotely with a mobile device, or the like) that performs the technique.

The system optionally receives a request for a display of the structure at a second level of detail (step 851). The second level of detail is higher than the first level of detail. In some implementations, the system receives a request from a user. For example, the user can zoom in on the structure. In other implementations, the system receives a request from another process, for example, a scripting engine or a request to render a view for printing or saving to an image file at higher precision than is used for display.

The system generates a second quilt representation (step 852). The second quilt representation is a refinement of the first quilt representation. In some scenarios, the second quilt representation does not show the entire structure. In those scenarios, the system optionally does not generate control points and patches for areas of the structure that do not need to be shown.

To generate the second quilt representation, the system determines a tangent vector for the first vertex (step 854). The tangent vector is based on the associated texture coordinate data and the associated cross-curvature data.

In some implementations, determining a tangent vector for the first vertex includes determining a difference vector comprising the difference in UV parameter space between the first vertex and a second vertex at the other end of a patch edge associated with the first vertex. In these implementations, the tangent vector is used to determine control points at the first vertex for the patch edge between the first vertex and the second vertex. The system determines the linear combination of a U direction tangent vector and a V direction tangent vector at the first vertex. Because the U direction tangent vector and the V direction tangent vector are tangent to the surface at the first vertex, a linear combination of those vectors is tangent to the surface at the first vertex.

The system weights the determined linear combination using the difference vector. The weighting factors are the differences in U and V coordinates from the first vertex to the second, that is, the "direction" in UV space from the first vertex to the second. The system determines that the tangent vector is the weighted linear combination.

The system optionally determines an additional tangent vector for the second vertex. The additional tangent vector is based on the direction from the second vertex to the first vertex, that is, an additional difference vector comprising the difference in UV parameter space between the second vertex and the first vertex. The system uses the additional tangent vector to determine control points for the second vertex along the patch edge between the second vertex and the first vertex.

The system determines one or more first control points for the first patch based on the first vertex and the determined tangent vector (step 856). Various techniques for determining the one or more first control points are possible. In some implementations, the system determines the one or more first control points using techniques similar to those used for N-patches, but substitutes the determined tangent vector for a tangent vector derived from surface normal vectors. For example, some N-patch techniques derive a tangent vector based on surface normal vectors and then determine control points based on that tangent vector. Instead, the system determines the tangent vector as described above, and then determines control points based on that tangent vector. Although the technique is illustrated as determining control points for only the first vertex, the system typically determines control points for other vertices.

The system associates the one or more first control points with the first quilt representation (step 858). In some implementations, the system keeps the first quilt representation and associates the one or more first control points with a copy. The system can generate other quilt representations from the first quilt representation when needed (for example, when a user zooms to a different display level of detail) and delete them when no longer needed.

In some implementations, where the system associated a surface normal vector with a second vertex, the system determines one or more second control points for the second patch based on the second vertex and the associated surface normal vector (step 860). The system associates the one or more second control points with the first quilt representation or a copy (step 862).

The system optionally displays the structure using the second quilt of patches. The system generates a second mesh of triangles based on the second quilt representation (step 864). Because the second quilt of patches has associated control points, the system facets the quilt to generate the second mesh of triangles.

In some implementations, generating the second mesh representation is performed by one or more second processors. For example, the one or more second processors can comprise a graphics processing unit (GPU). In various implementations, determining the one or more first control points is also performed by the one or more second processors.

The system displays the second mesh of triangles at a second zoom level (step 866).

Figure 9:
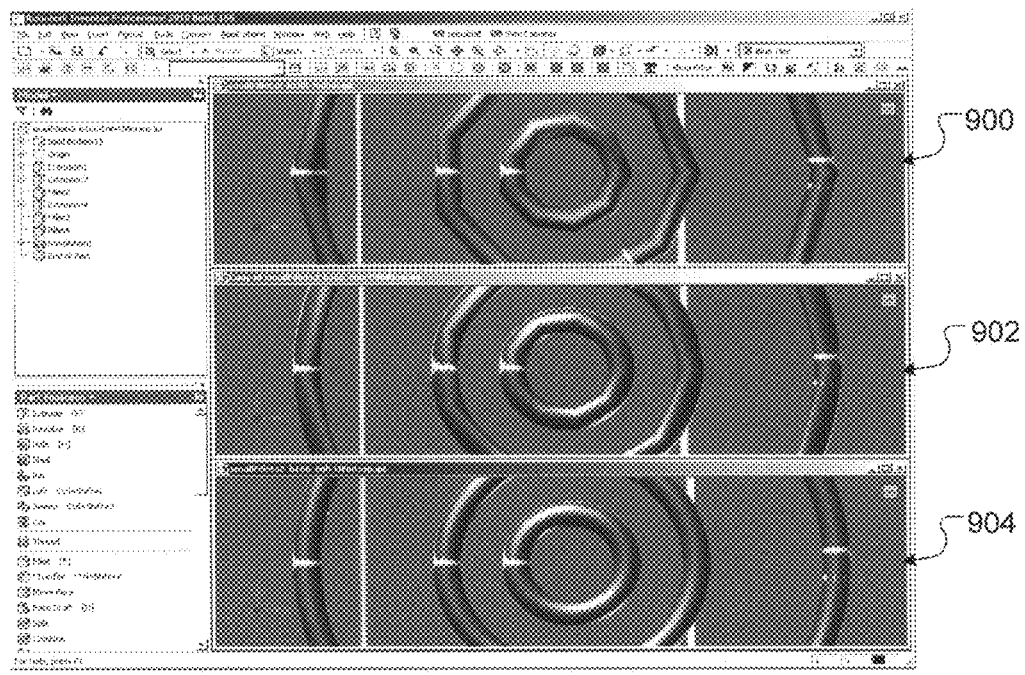
FIG. 9 shows three views of an example half-section torus raised from a planar face.

FIG. 9 shows three views of an example half-section torus raised from a planar face. The first view 900 shows the structure (the half-section torus raised from a planar face) represented by a first quilt of patches. The second view 902 shows the structure represented by a second quilt of patches. The second quilt of patches is a refined quilt based on the first quilt of patches, including surface normal vectors but not texture coordinate data and cross-curvature direction data. The third view 904 shows the structure represented by a third quilt of patches. The third quilt of patches is a refined quilt based on the first quilt of patches, including surface normal vectors, texture coordinate data, and cross-curvature data. For example, the techniques 800 and 850 illustrated in FIGS. 8A and 8B can be used to generate the third quilt of patches. The third quilt of patches represents a smooth torus whereas the second quilt of patches represents a blocky torus.

Figure 10:
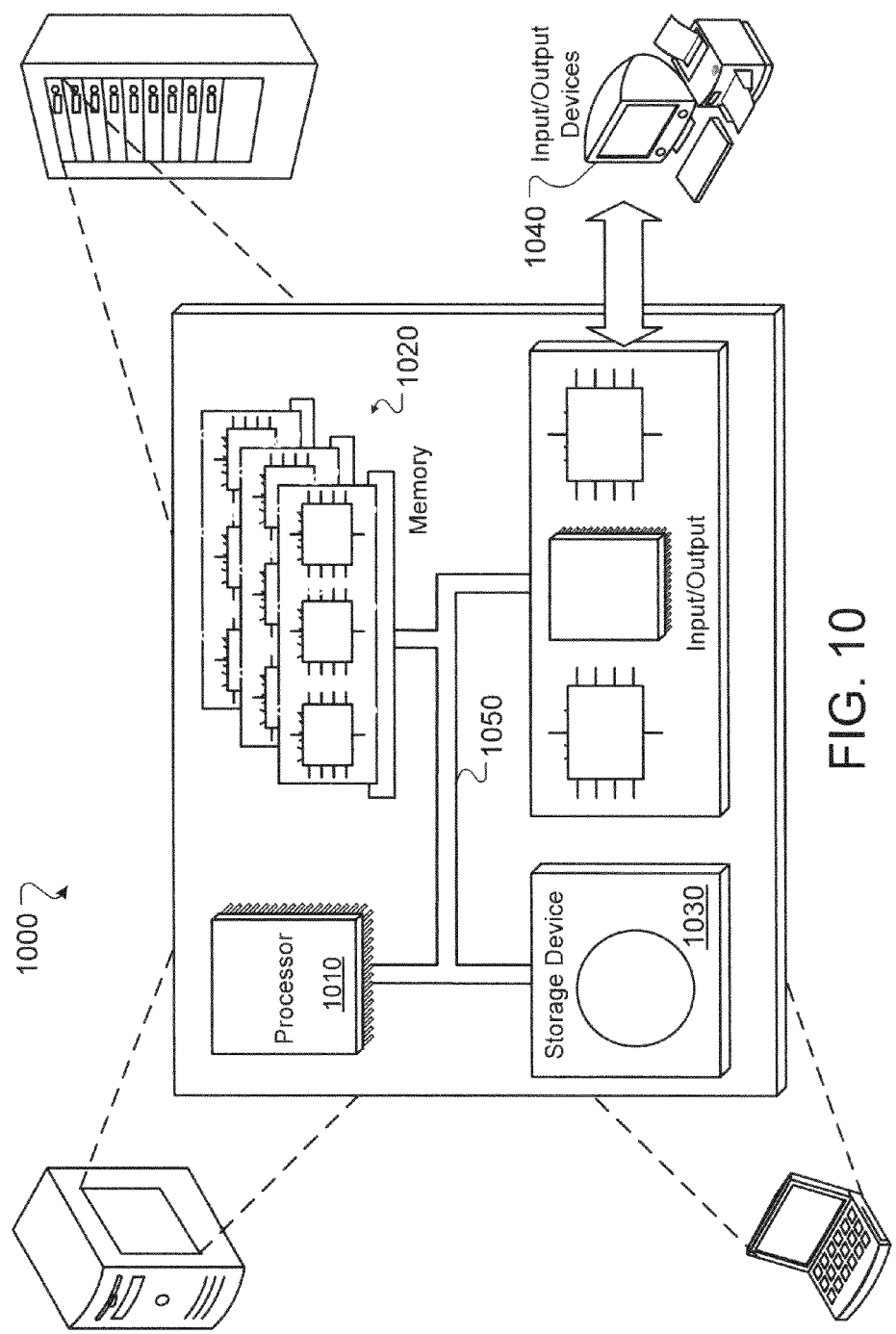
FIG. 10 is a schematic diagram of a generic computer system.

FIG. 10 is a schematic diagram of a generic computer system 1000. The system 1000 can be used for practicing operations described in association with the techniques 500, 550, 800, and 850. The system 1000 can include a processor 1010, a memory 1020, a storage device 1030, and input/output devices 1040. Each of the components 1010, 1020, 1030, and 1040 are interconnected using a system bus 1050. The processor 1010 is capable of processing instructions for execution within the system 1000. In some implementations, the processor 1010 is a single-threaded processor. In other implementations, the processor 1010 is a multi-threaded processor. In various implementations, the system 1010 includes one or more first processors (for example, comprising a central processing unit (CPU)) and one or more second processors (for example, comprising a graphics processing unit (GPU)). The processor 1010 is capable of processing instructions stored in the memory 1020 or on the storage device 1030 to display graphical information for a user interface on the input/output device 1040.

The memory 1020 is a computer readable medium such as volatile or non volatile that stores information within the system 1000. The memory 1020 can store data structures representing three dimensional models. The storage device 1030 is capable of providing persistent storage for the system 1000. The storage device 1030 may be a floppy disk device, a hard disk device, an optical disk device, or a tape device, or other suitable persistent storage means. The input/output device 1040 provides input/output operations for the system 1000. In one implementation, the input/output device 1040 includes a keyboard and/or pointing device. In another implementation, the input/output device 1040 includes a display unit for displaying graphical user interfaces.

The input/output device 1040 can provide input/output operations for a CAD system. The CAD system can be, for example, Autodesk Inventor, available from Autodesk, Inc., of San Rafael, Calif., or another CAD application or other software application.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A method for generating a quilt representation of a three-dimensional structure, the method comprising: generating a first quilt representation of a three-dimensional structure, including: identifying a model of the three-dimensional structure, the model representing the three-dimensional structure by a solid representation scheme, where: the model of the three-dimensional structure is one of: a boundary representation (B-rep) model, a function representation (F-rep) model, or a constructive solid geometry model (CSG); and faceting the model and generating the first quilt representation, the first quilt representation including representing the three-dimensional structure by a plurality of patches, the first quilt representation being associated with a first display level of detail, where the faceting is performed by one or more first processors;

adding information to the first quilt representation, including:
identifying an external edge of the three-dimensional structure based on the model,
identifying a first patch in the plurality of patches, the first patch including a first plurality of vertices, and a first vertex of the first plurality of vertices being on the identified external edge,
determining an edge direction vector for the identified external edge at the first vertex based on the model; and generating a second quilt representation based on the first quilt representation, including:
determining one or more first control points for the first patch based on the first vertex and the associated edge direction vector, and
associating the one or more first control points with the first quilt representation to generate the second quilt representation, the second quilt representation being associated with a second display level of detail, the second display level of detail being higher than the first display level of detail.

2. The method of claim 1 where:
adding information to the first quilt representation further includes:
identifying a second patch in the plurality of patches, the second patch including a second plurality of vertices, a second vertex being in the second plurality of vertices,
determining a normal vector for the second patch using the model, the normal vector being normal to the surface of the three-dimensional structure at the second vertex, and
associating the normal vector with the second vertex; and generating a second quilt representation based on the first quilt representation further includes:
determining one or more second control points for the second patch based on the second vertex and the associated normal vector, and
faceting the first quilt representation using the one or more second control points.

3. The method of claim 1 where:
generating the second quilt representation is performed in response to a request for the second display level of detail.

4. The method of claim 1 where:
the edge direction vector is normal or tangent to the direction of curvature of the identified external edge at the first vertex.

5. The method of claim 1, further comprising:
generating a mesh representation of the 3-D dimensional structure, including faceting the second quilt representation using the one or more control points, the mesh representation including a plurality of triangles.

6. The method of claim 5, where:
the one or more first processors comprise a central processing unit (CPU);
generating the mesh representation is performed by one or more second processors, where the one or more second processors comprise a graphics processing unit (GPU).

7. The method of claim 6, where:
determining the one or more first control points is performed by the CPU.

8. The method of claim 6, where:
determining the one or more first control points is performed by the GPU.

9. A computer program product, encoded on a non-transitory computer-readable storage device, operable to cause data processing apparatus to perform operations for generating a quilt representation of a three-dimensional structure, the operations comprising: generating a first quilt representation of a three-dimensional structure, including: identifying a model of the three-dimensional structure, the model representing the three-dimensional structure by a solid representation scheme, where: the model of the three-dimensional structure is one of: a boundary representation (B-rep) model, a function representation (F-rep) model, or a constructive solid geometry model (CSG); and faceting the model and generating the first quilt representation, the first quilt representation representing the three-dimensional structure by a plurality of patches, the first quilt representation being associated with a first display level of detail, where the faceting is performed by one or more first processors;

adding information to the first quilt representation, including:
identifying an external edge of the three-dimensional structure based on the model,
identifying a first patch in the plurality of patches, the first patch including a first plurality of vertices, and a first vertex of the first plurality of vertices being on the identified external edge,
determining an edge direction vector for the identified external edge at the first vertex based on the model; and generating a second quilt representation based on the first quilt representation, including:
determining one or more first control points for the first patch based on the first vertex and the associated edge direction vector, and
associating the one or more first control points with the first quilt representation to generate the second quilt representation, the second quilt representation being associated with a second display level of detail, the second display level of detail being higher than the first display level of detail.

10. The computer program product of claim 9 where:
adding information to the first quilt representation further includes:
identifying a second patch in the plurality of patches, the second patch including a second plurality of vertices, a second vertex being in the second plurality of vertices,
determining a normal vector for the second patch using the model, the normal vector being normal to the surface of the three-dimensional structure at the second vertex, and
associating the normal vector with the second vertex; and generating a second quilt representation based on the first quilt representation further includes:
determining one or more second control points for the second patch based on the second vertex and the associated normal vector, and
faceting the first quilt representation using the one or more second control points.

11. The computer program product of claim 9 where:
generating the second quilt representation is performed in response to a request for the second display level of detail.

12. The computer program product of claim 9 where:
the edge direction vector is normal or tangent to the direction of curvature of the identified external edge at the first vertex.

13. The computer program product of claim 9, where the operations further comprise:
generating a mesh representation of the 3-D dimensional structure, including faceting the second quilt representation using the one or more control points, the mesh representation including a plurality of triangles.

14. The computer program product of claim 13, where:
the one or more first processors comprise a central processing unit (CPU);
generating the mesh representation is performed by one or more second processors, where the one or more second processors comprise a graphics processing unit (GPU).

15. The computer program product of claim 14, where:
determining the one or more first control points is performed by the CPU.

16. The computer program product of claim 14, where:
determining the one or more first control points is performed by the GPU.

17. A system comprising: a computer-readable medium comprising a program product; a display device; and one or more first processors operable to interact with the display device and to execute the program product and perform operations for generating a quilt representation of a three-dimensional structure, the operations comprising: generating a first quilt representation of a three-dimensional structure, including: identifying a model of the three-dimensional structure, the model representing the three-dimensional structure by a solid representation scheme, where: the model of the three-dimensional structure is one of: a boundary representation (B-rep) model, a function representation (F-rep) model, or a constructive solid geometry model (CSG); and faceting
the model and generating the first quilt representation, the first quilt representation representing the three-dimensional structure by a plurality of patches, the first quilt representation being associated with a first display level of detail, where the faceting is performed by the one or more first processors;
adding information to the first quilt representation, including:
identifying an external edge of the three-dimensional structure based on the model,
identifying a first patch in the plurality of patches, the first patch including a first plurality of vertices, and a first vertex of the first plurality of vertices being on the identified external edge,
determining an edge direction vector for the identified external edge at the first vertex based on the model; and
generating a second quilt representation based on the first quilt representation, including:
determining one or more first control points for the first patch based on the first vertex and the associated edge direction vector, and
associating the one or more first control points with the first quilt representation to generate the second quilt representation, the second quilt representation being associated with a second display level of detail, the second display level of detail being higher than the first display level of detail.

18. The system of claim 17 where:
adding information to the first quilt representation further includes:
identifying a second patch in the plurality of patches, the second patch including a second plurality of vertices, a second vertex being in the second plurality of vertices,
determining a normal vector for the second patch using the model, the normal vector being normal to the surface of the three-dimensional structure at the second vertex, and
associating the normal vector with the second vertex; and
generating a second quilt representation based on the first quilt representation further includes:
determining one or more second control points for the second patch based on the second vertex and the associated normal vector, and
faceting the first quilt representation using the one or more second control points.

19. The system of claim 17 where:
generating the second quilt representation is performed in response to a request for the second display level of detail.

20. The system of claim 17 where:
the edge direction vector is normal or tangent to the direction of curvature of the identified external edge at the first vertex.

21. The system of claim 17 where the operations further comprise:
generating a mesh representation of the 3-D dimensional structure, including faceting the second quilt representation using the one or more control points, the mesh representation including a plurality of triangles.

22. The system of claim 21, where:
the one or more first processors comprise a central processing unit (CPU);
generating the mesh representation is performed by one or more second processors, where the one or more second processors comprise a graphics processing unit (GPU).

23. The system of claim 22, where:
determining the one or more first control points is performed by the CPU.

24. The system of claim 22, where:
determining the one or more first control points is performed by the GPU.

25. A method for generating a quilt representation of a three-dimensional structure, the model comprising: generating a first quilt representation of a three-dimensional structure, including: identifying a model of the three-dimensional structure, the model representing the three-dimensional structure by a solid representation scheme, where: the model of the three-dimensional structure is one of: a boundary representation (B-rep) model, a function representation (F-rep) model, or a constructive solid geometry model (CSG), and faceting
the model and generating the first quilt representation, the first quilt representation representing the three-dimensional structure by a plurality of patches, the quilt representation being associated with a first display level of detail, where the faceting is performed by one or more first processors;
adding information to the first quilt representation, including:
identifying a surface on the three-dimensional structure in the model, the surface including cross-curvature components, identifying a first patch in the plurality of patches, the
first patch including a first plurality of vertices, and a
first vertex of the first plurality of vertices being on the
identified surface,
using the model, determining texture coordinate data for
the first vertex and associating the texture coordinate
data with the first vertex,
using the model, determining cross-curvature direction
data for the first vertex and associating the cross-
curvature direction data with the first vertex; and
generating a second quilt representation based on the first
quilt representation, including:
determining a tangent vector for the first vertex based on
the associated texture coordinate data and the associ-
ated cross-curvature direction data,
determining one or more first control points for the first
patch based on the first vertex and the tangent vector;
and
associating the one or more first control points with the
first quilt representation to generate the second quilt
representation, the second quilt representation being
associated with a second display level of detail.

26. The method of claim 25 where:
adding information to the first quilt representation further
includes:
identifying a second patch in the plurality of patches, the
second patch including a second plurality of vertices,
a second vertex being in the second plurality of ver-
tices;
determining a normal vector for the second patch using
the model, the normal vector being normal to the
surface of the three-dimensional structure at the sec-
ond vertex; and
associating the normal vector with the second vertex;
and
generating a second quilt representation based on the first
quilt representation further includes:
determining one or more second control points for the
second patch based on the second vertex and the asso-
ciated normal vector; and
faceting the first quilt representation using the one or
more second control points.

27. The method of claim 25 where:
generating the second quilt representation is performed in
response to a request for the second display level of
detail.

28. The method of claim 25 where:
the structure is one of: a torus, a toroid, a toroidal fillet, a
helical structure, a helical coil, or another structure
including a surface with curvature in directions tangent
to the surface.

29. The method of claim 25, further comprising:
generating a mesh representation of the 3-D dimensional
structure, including faceting the second quilt represen-
tation using the one or more control points, the mesh
representation including a plurality of triangles.

30. The method of claim 29, where:
the one or more first processors comprise a central process-
ing unit (CPU);
generating the mesh representation is performed by one or
more second processors, where the one or more second
processors comprise a graphics processing unit (GPU).

31. The method of claim 30, where:
determining the one or more first control points is per-
formed by the GPU.

32. The method of claim 25 where:
texture coordinate data includes UV parameter informa-
tion comprising a U direction coordinate and a V direc-
tion coordinate, and where the texture coordinate data is
based on the parameter space of the model; and
cross-curvature direction data includes a U direction tan-
gent vector giving the direction tangent to the surface in
the U direction and a V direction tangent vector giving
the direction tangent to the surface in the V direction,
and scalar data giving the aspect ratio of parameter space
in the U and V directions.

33. The method of claim 32 where determining a tangent
vector based on the associated texture coordinate data and the
associated cross-curvature direction data includes:
determining a difference vector comprising the difference
in UV parameter space between the texture coordinates
at the first vertex and the texture coordinates at a second
vertex at the other end of a patch edge associated with the
first vertex; and
determining the linear combination of a U direction tan-
gent vector and a V direction tangent vector at the first
vertex and weighting the determined linear combination
using the difference vector; and
determining the tangent vector based on the weighted lin-
ear combination.

34. A computer program product, encoded on a non-tran-
sitory computer-readable storage device, operable to cause
data processing apparatus to perform operations for generat-
ing a quilt representation of a three-dimensional structure, the
operations comprising: generating a first quilt representation
of a three-dimensional structure, including: identifying a
model of the three-dimensional structure, the model repre-
senting the three-dimensional structure by a solid represen-
tation scheme, where: the model of the three-dimensional
structure is one of: a boundary representation (B-rep) model,
a function representation (F-rep) model, or a constructive
solid geometry model (CSG), and faceting
the model and generating the first quilt representation, the
first quilt representation representing the three-dimen-
sional structure by a plurality of patches, the quilt rep-
resentation being associated with a first display level of
detail, where the faceting is performed by one or more
first processors;
adding information to the first quilt representation, includ-
ing:
identifying a surface on the three-dimensional structure
in the model, the surface including cross-curvature
components,
identifying a first patch in the plurality of patches, the
first patch including a first plurality of vertices, and a
first vertex of the first plurality of vertices being on the
identified surface,
using the model, determining texture coordinate data for
the first vertex and associating the texture coordinate
data with the first vertex,
using the model, determining cross-curvature direction
data for the first vertex and associating the cross-
curvature direction data with the first vertex; and
generating a second quilt representation based on the first
quilt representation, including:
determining a tangent vector for the first vertex based on
the associated texture coordinate data and the associ-
ated cross-curvature direction data,
determining one or more first control points for the first
patch based on the first vertex and the tangent vector;
and associating the one or more first control points with the first quilt representation to generate the second quilt representation, the second quilt representation being associated with a second display level of detail.

35. The computer program product of claim 34 where:
adding information to the first quilt representation further includes:
  identifying a second patch in the plurality of patches, the second patch including a second plurality of vertices, a second vertex being in the second plurality of vertices;
  determining a normal vector for the second patch using the model, the normal vector being normal to the surface of the three-dimensional structure at the second vertex; and
  associating the normal vector with the second vertex; and
generating a second quilt representation based on the first quilt representation further includes:
  determining one or more second control points for the second patch based on the second vertex and the associated normal vector; and
  faceting the first quilt representation using the one or more second control points.

36. The computer program product of claim 34 where:
generating the second quilt representation is performed in response to a request for the second display level of detail.

37. The computer program product of claim 34 where:
the structure is one of: a torus, a toroid, a toroidal fillet, a helical structure, a helical coil, or another structure including a surface with curvature in directions tangent to the surface.

38. The computer program product of claim 34, where the operations further comprise:
generating a mesh representation of the 3-D dimensional structure, including faceting the second quilt representation using the one or more control points, the mesh representation including a plurality of triangles.

39. The computer program product of claim 34, where:
the one or more first processors comprise a central processing unit (CPU);
generating the mesh representation is performed by one or more second processors, where the one or more second processors comprise a graphics processing unit (GPU).

40. The computer program product of claim 39, where:
determining the one or more first control points is performed by the GPU.

41. The computer program product of claim 34, where:
texture coordinate data includes UV parameter information comprising a U direction coordinate and a V direction coordinate, and where the texture coordinate data is based on the parameter space of the model; and
cross-curvature direction data includes a U direction tangent vector giving the direction tangent to the surface in the U direction and a V direction tangent vector giving the direction tangent to the surface in the V direction, and scalar data giving the aspect ratio of parameter space in the U and V directions.

42. The computer program product of claim 35 where determining a tangent vector based on the associated texture coordinate data and the associated cross-curvature direction data includes:
  determining a difference vector comprising the difference in UV parameter space between the texture coordinates at the first vertex and the texture coordinates at a second vertex at the other end of a patch edge associated with the first vertex; and
  determining the linear combination of a U direction tangent vector and a V direction tangent vector at the first vertex and weighting the determined linear combination using the difference vector; and
  determining the tangent vector based on the weighted linear combination.

43. A system comprising: a computer-readable medium comprising a program product; a display device; and one or more first processors operable to interact with the display device and to execute the program product and perform operations for generating a quilt representation of a three-dimensional structure, the operations comprising: generating a first quilt representation of a three-dimensional structure, including: identifying a model of the three-dimensional structure, the model representing the three-dimensional structure by a solid representation scheme, where: the model of the three-dimensional structure is one of: a boundary representation (B-rep) model, a function representation (F-rep) model, or a constructive solid geometry model (CSG), and faceting the model and generating the first quilt representation, the first quilt representation representing the three-dimensional structure by a plurality of patches, the quilt representation being associated with a first display level of detail, where the faceting is performed by the one or more first processors;
adding information to the first quilt representation, including:
  identifying a surface on the three-dimensional structure in the model, the surface including cross-curvature components,
  identifying a first patch in the plurality of patches, the first patch including a first plurality of vertices, and a first vertex of the first plurality of vertices being on the identified surface,
  using the model, determining texture coordinate data for the first vertex and associating the texture coordinate data with the first vertex,
  using the model, determining cross-curvature direction data for the first vertex and associating the cross-curvature direction data with the first vertex; and
generating a second quilt representation based on the first quilt representation, including:
  determining a tangent vector for the first vertex based on the associated texture coordinate data and the associated cross-curvature direction data,
  determining one or more first control points for the first patch based on the first vertex and the tangent vector; and
  associating the one or more first control points with the first quilt representation to generate the second quilt representation, the second quilt representation being associated with a second display level of detail.

44. The system of claim 43 where:
adding information to the first quilt representation further includes:
  identifying a second patch in the plurality of patches, the second patch including a second plurality of vertices, a second vertex being in the second plurality of vertices;
  determining a normal vector for the second patch using the model, the normal vector being normal to the surface of the three-dimensional structure at the second vertex; and associating the normal vector with the second vertex; and generating a second quilt representation based on the first quilt representation further includes:
- determining one or more second control points for the second patch based on the second vertex and the associated normal vector; and
- faceting the first quilt representation using the one or more second control points.

45. The system of claim 43 where:
generating the second quilt representation is performed in response to a request for the second display level of detail.

46. The system of claim 43 where:
the structure is one of: a torus, a toroid, a toroidal fillet, a helical structure, a helical coil, or another structure including a surface with curvature in directions tangent to the surface.

47. The system of claim 43, where the operations further comprise:
generating a mesh representation of the 3-D dimensional structure, including faceting the second quilt representation using the one or more control points, the mesh representation including a plurality of triangles.

48. The system of claim 43, where:
- the one or more first processors comprise a central processing unit (CPU);
- generating the mesh representation is performed by one or more second processors, where the one or more second processors comprise a graphics processing unit (GPU).

49. The system of claim 43, where:
determining the one or more first control points is performed by the GPU.

50. The system of claim 43, where:
- texture coordinate data includes UV parameter information comprising a U direction coordinate and a V direction coordinate, and where the texture coordinate data is based on the parameter space of the model; and
- cross-curvature direction data includes a U direction tangent vector giving the direction tangent to the surface in the U direction and a V direction tangent vector giving the direction tangent to the surface in the V direction, and scalar data giving the aspect ratio of parameter space in the U and V directions.

51. The system of claim 43 where determining a tangent vector based on the associated texture coordinate data and the associated cross-curvature direction data includes:
- determining a difference vector comprising the difference in UV parameter space between the texture coordinates at the first vertex and the texture coordinates at a second vertex at the other end of a patch edge associated with the first vertex; and
- determining the linear combination of a U direction tangent vector and a V direction tangent vector at the first vertex and weighting the determined linear combination using the difference vector; and
- determining the tangent vector based on the weighted linear combination.

* * * * *

UNITED STATES PATENT AND TRADEMARK OFFICE
CERTIFICATE OF CORRECTION

PATENT NO. : 8,355,020 B1
APPLICATION NO. : 12/381625
DATED : January 15, 2013
INVENTOR(S) : Paul Hanau and Bennett Battaile It is certified that error appears in the above-identified patent and that said Letters Patent is hereby corrected as shown below:

Claim 1, Column 18, Line 66 – after "representation" delete "including".

Claim 25, Column 22, Line 47 – delete "model" and insert -- method --, therefor.

Signed and Sealed this
Second Day of April, 2013

Teresa Stanek Rea
*Acting Director of the United States Patent and Trademark Office*